P. A. LA FRANCE, OF ELMIRA, NEW YORK, ASSIGNOR TO HIMSELF AND OSCAR B. GRAY, OF NEW YORK CITY.

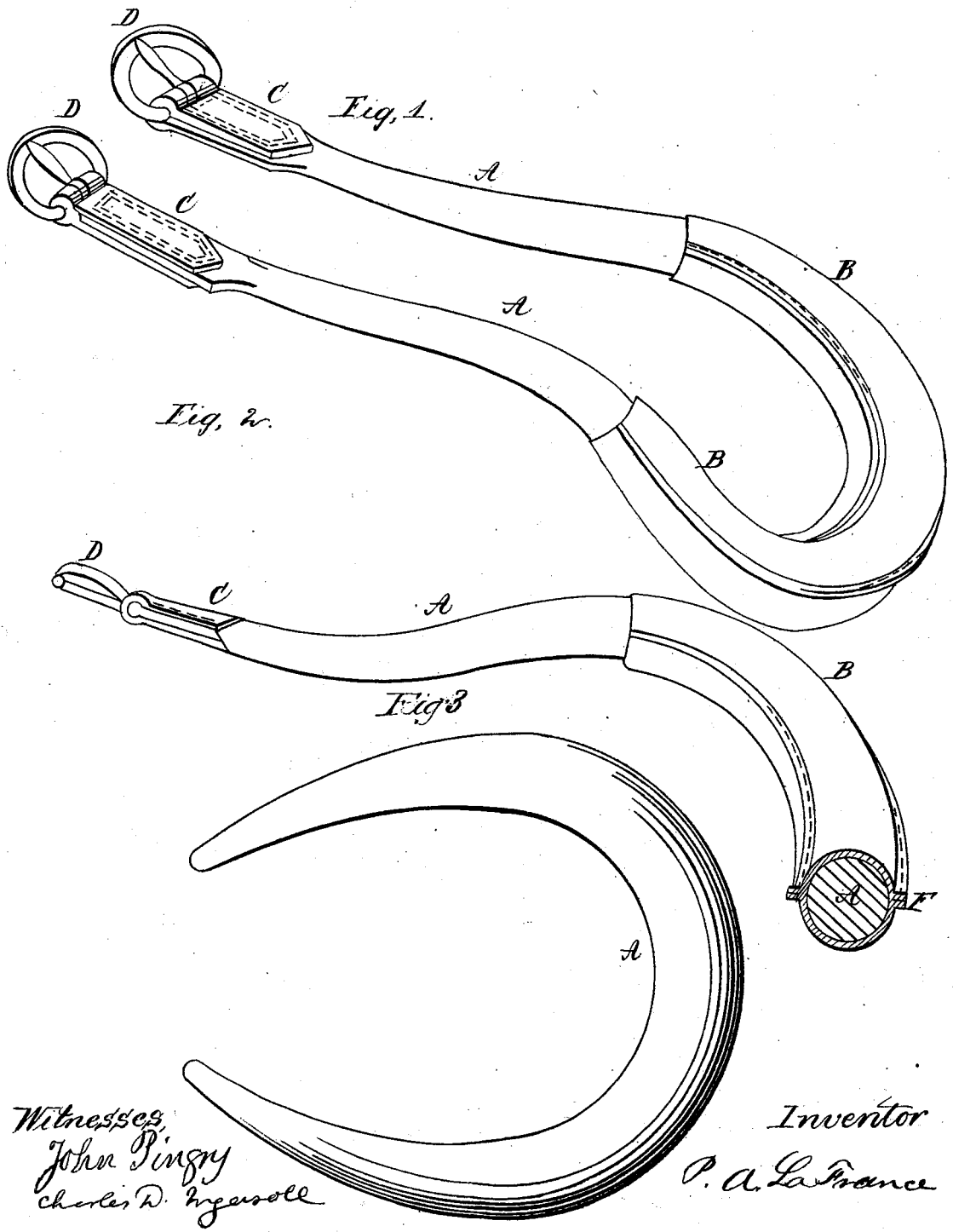

Letters Patent No. 87,269, dated February 23, 1869.

IMPROVED HORSE-CRUPPER.

The Schedule referred to in these Letters Patent and making part of the same.

*To all whom it may concern:*

Be it known that I, P. A. LA FRANCE, of Elmira, Chemung county, State of New York, have invented a new and useful Improvement in Cruppers; and I do hereby declare that the following is a full and exact description thereof, reference being had to the accompanying drawings, which are a part of this specification.

Figure 1 is a perspective view of the crupper, showing the buckles D attached at C, and partially covered with leather, as at B E. Part A is uncovered, to give elasticity, and make it easy to the animal.

Figure 2 is a sectional view of the same, exhibiting the rubber at A, and the leather at F.

Figure 3 shows the general form of the rubber, when used as a foundation or filling, to be covered with leather.

The nature and object of my invention are to provide a horse-crupper, made of rubber or gutta-percha in whole, which may be combined with cloth, or other suitable material to give it body and strength, and so the leather strap or buckle may be more readily stitched to or otherwise secured to it.

In addition to this mode of construction, I cover a suitable portion of the rubber with leather, or I make a suitable form of rubber to receive a covering partially or wholly of leather.

The advantages of the rubber crupper, compared with the leather crupper, are as follows:

It can be made cheaper by one-half. It never will lose its form and shape. It is flexible and elastic, and will adapt itself to the different formations of the animal, giving more ease and liberty, and prevent chafing. It is also impervious to perspiration and moisture, which leather is not. It is always elastic and pliable, and does not become dry, and hard, and shapeless.

I do not claim broadly India-rubber cruppers, made of hose or tubing, or of other substance covered with India rubber; but What I do claim, and desire to secure by Letters Patent, is—

As an article of manufacture, cruppers, made of solid vulcanized rubber, constructed in the manner herein described.

P. A. LA FRANCE.

Witnesses:
 JOHN PINGRY,
 CHARLES D. INGERSOLL.